United States Patent [19]
Secher et al.

[11] Patent Number: 5,367,331
[45] Date of Patent: Nov. 22, 1994

[54] VIDEO CODEC, FOR A VIDEOPHONE TERMINAL OF AN INTEGRATED SERVICES DIGITAL NETWORK

[75] Inventors: Fernand Secher, Pleumeur Bodou; Jean Thiberville, Trebeurden; Gérard Douhet, Fegersheim; Christian Freund; Yves Rasse, both of Strasbourg, all of France

[73] Assignee: Alcatel N.V., Amsterdam, Netherlands

[21] Appl. No.: 21,042

[22] Filed: Feb. 23, 1993

[30] Foreign Application Priority Data

Feb. 24, 1992 [FR] France ............................... 92 02103

[51] Int. Cl.$^5$ ........................................ H04M 11/00
[52] U.S. Cl. .................................... 348/14; 348/17
[58] Field of Search ................ 379/53, 54, 93, 96–98; 358/85, 105, 141, 186; 348/14, 17–19, 22, 24, 467, 723

[56] References Cited

U.S. PATENT DOCUMENTS 4,949,169  8/1990  Lumelsky et al. .
5,046,080  9/1991  Lee et al. ............................... 379/53

FOREIGN PATENT DOCUMENTS 036002  3/1990  European Pat. Off. .

OTHER PUBLICATIONS

Patent Abstracts of Japan, vol. 11, No. 314 (E-549) May 19, 1987 & JP-A-62 108 690 (Nippon Telegr & Teleph Corp) Nov. 6, 1985.

Primary Examiner—Wing F. Chan
Attorney, Agent, or Firm—Sughrue, Mion, Zinn, Macpeak & Seas

[57] ABSTRACT

A video codec for a videophone terminal of an integrated services digital network. The codec is organized to receive firstly image signals from a television camera so as to transmit them, after compressing and encoding them, to a remote video decoding unit, via a digital transmission line, and secondly similarly-processed image signals via the digital transmission line, so as to decompress and decode them for a television screen receiver locally connected to the video codec. The video codec includes a processing unit, of the integrated circuit type, co-operating with a single external memory plane both to compress and encode data to be transmitted, and also to decompress and decode received data, with the assistance of internal operational components time shared so as to apply known methods to transmission and to reception.

9 Claims, 6 Drawing Sheets

VIDEO CODEC, FOR A VIDEOPHONE TERMINAL OF AN INTEGRATED SERVICES DIGITAL NETWORK

The invention relates to a video codec, in particular for videophone applications, and more particularly for a terminal of an integrated services digital network.

BACKGROUND OF THE INVENTION

Conventionally, establishing communication between terminals in an integrated services digital network (ISDN) for the purposes of videophone calls, involves using high data-rate lines between interconnected terminals for the purposes of transmitting video signals, because of the quantity of information contained in each image.

Although it is technically possible to make such lines available to users, it is not currently economically viable, since the cost is prohibitive.

This has led to research into reducing the quantity of information to be transmitted, in particular by means of image data compression and time prediction techniques, so that only information that is essential and that is in the most compact form possible is transmitted.

The article "Visages" by J. Guichard and G. Eudes published in 1990 in issue No. 140 of the review "L'Echo des Recherches", published in Issy-les-Moulineaux, France, mentions a research program aimed at enabling animated images to be transmitted between videophones via channels whose data rate is equal to or a multiple of 64 Kbit/s, in compliance with CCITT Recommendation H261. That research considers individually connecting each of the videophones to an ISDN network basic access which offers a useful data rate of 144 Kbit/s divided between two 64 Kbit/s B channels and one 16 Kbit/s D channel.

Although in that way a considerable reduction can be made in the digital data rate required for transmitting animated images between videophones temporarily interconnected by means of an ISDN network, each of the videophones must nevertheless be capable both of compressing the image information that it picks up locally, prior to transmitting the information in compressed form, and of decompressing the image information that is reconstituted locally after it has been transmitted over the ISDN network.

As a result, the complexity of the operations to be performed on the image information bits and the volumes of memory required for storing said bits temporarily are such that the compression operation and the decompression operations are conventionally performed by means of units that are physically distinct, referred to respectively as "video encoding units" and "video decoding units" which are complex and involve a large number of components.

Those components are not organized optimally, and prior art codecs are therefore costly and bulky, and as a result they are not viable for applications, such as videophone systems, intended for mass consumption.

SUMMARY OF THE INVENTION

The invention therefore provides a video codec, particularly for videophone applications, and more particularly for a videophone terminal of an integrated services digital network. The codec is organized to receive firstly image signals coming from a local television camera so as to transmit them, after compressing and encoding them using known methods for transmission purposes, to a compatible remote video decoding unit, in particular of another video codec, via a digital transmission line, in particular of the telephone type, and secondly image signals similarly compressed and encoded by a remote video encoding unit, in particular of said other video codec, the similarly compressed image signals being received via the digital transmission line, and then being decompressed and decoded for a television screen receiver locally connected to said video codec. According to the invention, said video codec includes a processing unit, of the integrated circuit type, co-operating with a single external memory plane both to compress and encode data to be transmitted, and also to decompress and decode received data, with the assistance of internal operational components time shared so as to apply known methods to transmission and to reception.

BRIEF DESCRIPTION OF THE DRAWINGS

The invention, and the characteristics and advantages thereof are made clearer in the following description given with reference to the accompanying drawings, in which.

MORE DETAILED DESCRIPTION

Figure 1:
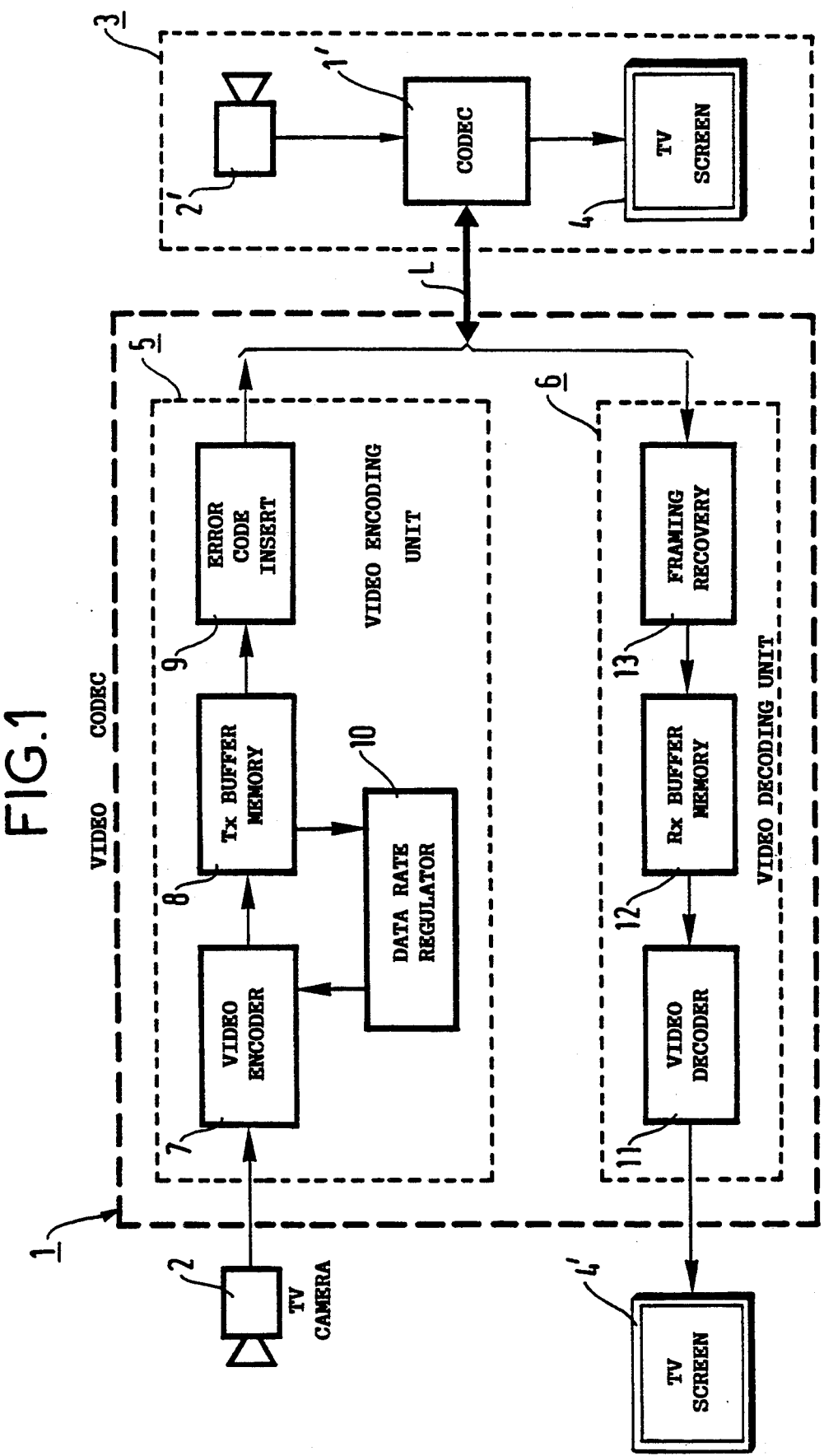
FIGS. 1, 2, and 3 are block diagrams respectively showing a conventional video codec, and the video encoding unit and the video decoding unit making up that codec.

Video codec 1, whose architecture is conventional, shown in FIG. 1, is designed to enable video image signals supplied by a television camera 2 to be encoded so that they can be transmitted via a two-way digital line L of a telephone network (not shown in detail) to another codec 1' of remote equipment 3 provided with a television screen receiver 4 enabling the filmed images to be shown, each codec 1 or 1' commonly making it possible both to encode the video image signals produced by a camera associated with it, such as 2 or 2', so that the signals can be transmitted, and also to decode the signals received over the digital line L into video image signals that can be used by a television screen receiver such as 4 or 4'.

To this end, that type of video codec, which is commonly dependent on an external processor and on an external clock (neither of which is shown), includes firstly a video encoding unit 5 capable of receiving the signals coming from the camera 2 and of processing them so that the line L can transmit all of the information required to enable the images that are filmed by camera 2 to be reconstituted at the receiver 4 of the remote equipment 3, the information being put into a form and at a data rate that are both compatible with those accepted by the line L. Secondly, the codec includes a video decoding unit 6 capable of using the information that it receives via the line from codec 1' to reconstitute the video image signals required to enable the images filmed by camera 2' to be reproduced on the screen of the receiver 4.

The video encoding unit 5 essentially includes a video encoder 7 receiving the signals from camera 2, with a transmission buffer memory 8 being placed at the output of the video encoder. The transmission buffer memory is in turn connected to the digital line L via an error correction code insertion circuit 9, and a data-rate regulator 10 is also associated with the transmission memory 8 and with the video encoder 7 so that the video encoder can adapt its data rate as a function of the volume of information to be transmitted over the digital line L, which volume is already contained in the transmission memory 8.

The video decoding unit 6 essentially includes a video decoder 11 receiving the information transmitted via the digital line L from the codec 1' of the remote equipment 3, the information being supplied to the video decoder via a reception buffer memory 12 which in turn receives the information from an error correction code framing recovery circuit 13 capable of processing the information inserted for its attention by an error correction code insertion circuit usually corresponding to the insertion circuit 9 of the video codec 1 of which it is part.

The insertion circuit 9 and the framing recovery circuit 13 may be of conventional type and are only indirectly relevant to the present invention. Therefore they are not mentioned in any further detail below.

Figure 2:
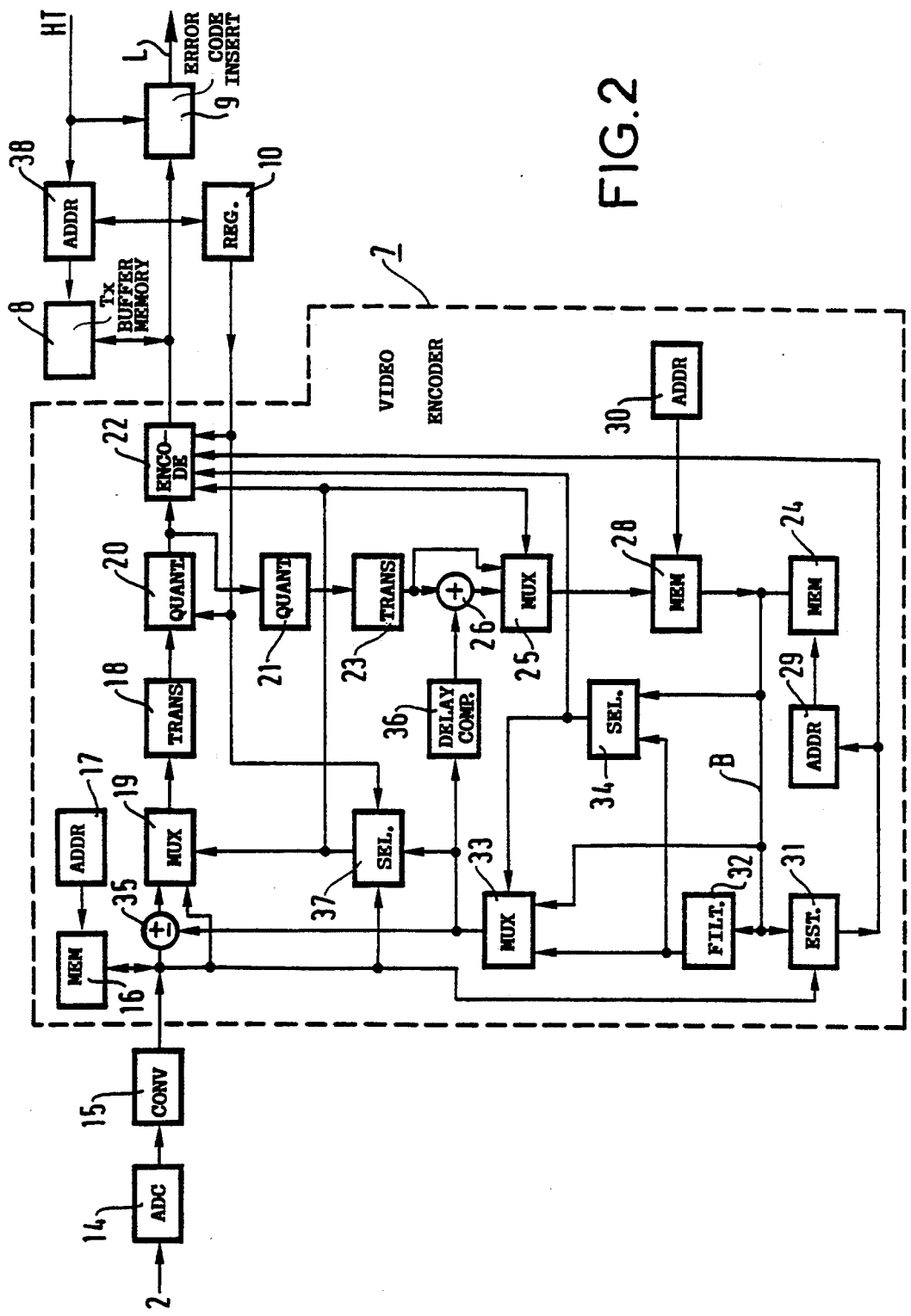

An example of an encoding unit 5 is shown in FIG. 2, in which the unit is organized so as to comply with above-mentioned Recommendation H261, and therefore so as to receive the video image signals that are supplied to it by the television camera 2 in the form of analog signals whose luminance and chrominance are standardized in 50 Hz, 625 line standard or 60 Hz, 525 line standard.

The received signals are, in general, digitized by means of an analog to digital converter 14 before being transmitted to a standards converter 15 in which they are converted to a common intermediate format, such as the normal-size format CIF or the quarter-size format QCIF provided in Recommendation H261.

By converting the image information to a common intermediate format, it is possible to compress said information so that it can be transmitted via the telephone line L, in this case the video encoder 7 processing non-interlaced images encoded as chrominance and luminance components.

For the purposes of processing, each image is assumed to be divided into the same number of groups of blocks, each group being made up of the same number of macroblocks. The numbers are respectively three and thirty-three for an image in QCIF format.

Each macroblock corresponds to the dots of a portion of image which is broken down into one luminance block of the sixteen-by-sixteen type, and two distinct chrominance blocks of eight-by-eight type.

The two chrominance blocks are sub-sampled relative to the corresponding luminance block which relates to the dots of the same portion of image covered by means of four matrix luminance blocks, each of which comprises eight lines and eight columns.

Insofar as the video image signals received from camera 2 are obtained by the images being scanned line by line, and insofar as the images are processed in blocks, and groups of blocks, a "scanning conversion" addressable memory 16 is provided at the input of the video encoder 7 proper, to enable digitized image information coming from the standards converter 15 to be temporarily stored, and previously stored information to be transferred to those circuits of the video encoder in which the processing is performed.

An addressing auxiliary 17 is conventionally associated with the scanning conversion memory 16 to provide read and write addressing thereof under the control of a clock circuit (not shown) for supervising the codec 1.

In this case, the video encoder 7 is of the hybrid prediction and transformation type. It combines an inter-image prediction loop applied in the time dimension to the differential pulse code modulated signals, a direct discrete cosine transformation on the basis of the blocks, a quantification of the coefficients obtained by direct transformation, and variable-length encoding. In addition, prediction involves an inverse quantification and an inverse discrete cosine transformation at the encoder to provide a realistic simulation of transmitted image.

A first direct discrete cosine transform operator 18 is connected via a multiplexer 19 to the block information sources constituted by the standards converter 15, the scanning conversion memory 16, and certain constituent parts of the prediction loop that are defined below.

The first transform operator 18 performs $8 \times 8$ size two-dimensional transformation on the blocks that it receives, as provided in Recommendation H261, and it makes it possible, as is known, to obtain a good decorrelation of the coefficients in the transform domain and a statistical concentration of the coefficients in a limited region of the transform plane. In addition, some of the operations performed on the coefficients, in particular deleting them, and modifying and quantifying their amplitudes, are similar to linear filtering operations in noise.

A first quantifier 20 is connected to the output of the transform operator 18, so that the data rate can be sufficiently reduced by compression to enable the image information to be transmitted over the telephone line L, such quantification also being generally defined in Recommendation H261.

In known manner, different encoding modes may be chosen for the blocks, in particular the "intra" mode, in the absence of prediction, and the "inter" mode, with prediction, wherein movement estimation and/or filtering are optionally taken into account, the same mode usually being implemented for all the blocks transmitted in a macroblock.

Coefficients of very large amplitude are clipped, and coefficients of very low amplitude are eliminated by applying uniform quantification whose pitch defines the number of bits to be transmitted. A different quantification is normally applied to the DC component representing the mean value of a block to be transmitted, during encoding in intra mode so that the value is clearly defined, as explained in the above-mentioned article "Visages".

A second quantifier 21 and a video multiplexing and entropy encoding circuit 22 are connected in parallel at the output of the first quantifier 20.

The quantifiers 20 and 21 are inverted relative to each other, with the second one of them being applied to a second discrete cosine transform operator 23 acting inversely relative to the first operator 18.

The assembly formed by the second quantifier 21 and by the second operator 23 make it possible to reconstitute, for prediction purposes, an image corresponding to the image which is reconstructed by codec 1', so that it can be displayed by the remote television screen receiver 4. The resulting digital data of the image reconstructed locally must therefore be stored temporarily to serve as a basis for prediction.

The prediction makes it possible to transmit only that information which corresponds to changes that have appeared on an image relative to the preceding image, such information being established on the basis of encoded and transformed differences between an image to be encoded and the prediction obtained on the basis of the preceding image that is reconstituted locally.

The digital data processed by the second operator 23 is temporarily stored by an "image" memory 24, e.g. capable of retaining the bytes which correspond to information relating to an image which is both transmitted and simultaneously decoded locally.

A multiplexer 25 is inserted between the second operator 23 and the image memory 24 to make it possible to take into account the selected encoding mode (inter mode or intra mode), the digital data being transmitted directly from the second operator 23 to the multiplexer 25, without further intervention, when the intra mode is used, and optionally being subjected to the action of an adder 26 when the inter mode is selected, i.e. when time prediction is being performed.

The time prediction is performed by seeking what distinguishes a reconstituted image from the preceding image, with only the significant differences between the images then being transmitted, after transformation and encoding, to the remote equipment.

To this end, a prediction circuit is provided which receives the digital data enabling it to establish differences between images, the data being supplied by image memory 24 and by the scanning conversion memory 16.

Addressing auxiliaries 29 and 30 are respectively associated with the memories 24 and 28, and they are placed under the control of the clock circuit of the codec 1, in the same way as the addressing auxiliary 17 mentioned above, the clock circuit acting in line with the prediction circuit for the image memory 24.

As indicated above, the prediction is preferably hybrid, and it associates movement estimation and filtering with time prediction.

A movement estimation circuit 31 is connected via a link B, of the bus type, to the image memory 24 and to the scanning conversion memory 16 to estimate the displacements that have occurred by going from one image to the next on the basis of analysis making use of the block organization of the reconstituted image information.

The estimation circuit 31 makes it possible to determine whether, for a given block of an image for which block prediction is under way, there is a block that at least substantially corresponds in the preceding image, and whether in this case the given block has been displaced relative to the corresponding block of the preceding image.

This makes it possible to transmit nothing to the remote equipment should the blocks remain fixed from one image to the other, to transmit only an encoded indication of movement vector together with an encoded estimate of prediction error should displacement be detected, and failing that to perform encoding in intra mode for the blocks that have no corresponding blocks in the preceding image, which blocks normally relate to new portions of image.

The movement estimation circuits do not usually enable the displacements of a block to be predicted satisfactorily when the displacements correspond to movement other than merely in translation or in which the displacement does not exactly correspond to an integer number of image dots.

Conventionally, to remedy that drawback, a low-pass digital "loop" filter 32 is provided connected to link B to retain only those low frequencies predicted without ambiguity which correspond to clearly determined movements in translation of a block.

The output of the loop filter 32 is applied both to an input of a multiplexer 33 having another input connected to link B, and also to an input of a first selector 34 in turn connected to link B via a second input. The selector makes it possible to determine, as a function of the result of filtering, whether the digital data transmitted by the multiplexer 33 is to be the data transmitted by the loop filter 32 or the data present over link B, and to control the multiplexer 33 accordingly.

The multiplexer is connected to the input of a subtracter 35 inserted upstream from the multiplexer 19 and from the first transform operator 18 in the video encoder 7, and to the input of an image reconstruction loop delay compensator circuit 36 whose output is applied to an auxiliary input of the adder 26 connected to the output of the second transform operator 23, so that the same transit time between multiplexer 33 and multiplexer 25 is allocated both to the digital data received via the adder 26 and via the compensator circuit 36 and to the data obtained via the subtracter 35, from the scanning conversion memory 16 and via the assembly including the multiplexer 19, the transform operators 18 and 23 and the quantifiers 20 and 21.

A second selector 37 is also included in the video encoder 7. The second selector makes it possible, following one of the successive addressing operations of the image block by the addressing auxiliary 17, to determine whether the block data transmitted to the first transform operator 18 via the multiplexer 19 is to be the "intra mode" data coming directly from the scanning conversion memory 16 with no modification, or the "inter mode" data which has previously been processed, as a function of the digital information coming from the multiplexer 33, after movement estimation and/or filtering with a preceding image as a reference.

To this end, the second selector 37 is essentially connected to the output of the scanning conversion memory 16 and to the output of the multiplexer 33.

As indicated above, the video multiplexing and entropy encoding circuit 22 serves both to variable-length encode the quantified transformation coefficients which are supplied by the first quantifier 20 and which are of fixed length, and also to construct, by means of appropriate time multiplexing, the stream of digital data that is to be transmitted to the remote equipment 3, via the line L.

For example, the variable-length encoding is of the type described in the article "Visages" mentioned on page 1 of the present application and it is therefore only mentioned briefly below. As indicated in that document, many transformation coefficients are not significant for image reconstruction, and as a result of the properties of the discrete cosine transformation, there is only a low probability that the coefficients have large amplitude. Therefore, variable-length encoding is advantageous, and an effective solution consists in transmitting the respective amplitudes of the significant transformation coefficients and the respective positions of these coefficients, the positions preferably being supplied with reference to an image scanning frame rather than by giving their coordinates in the image plane, in order to reduce the volume of data to be transmitted.

For encoding purposes, the positions inside a block are preferably scanned in a zigzag, the position of a first significant transformation coefficient being identified by its distance from a point selected as being the scanning origin, the respective positions of the other significant coefficients being individually identified by their distances relative to the position of the preceding significant coefficient in scan order.

The amplitude and the position of each significant transformation coefficient in a block is digitally encoded by the circuit 22 for the purposes of being transmitted to the remote codec 1'.

The video multiplexing is performed in conventional manner, and it is intended to enable all of the digital information required by the remote equipment 3 for reconstructing the images to be transmitted in a determined frame.

The multiplexed encoded digital information is supplied by the various constituent parts of the encoding unit that acts on the data. The multiplexed encoded digital information includes in particular video synchronization information, indications relating to the addresses of the encoded macroblocks, and to the type of encoding implemented for the macroblocks, indications on the quantification pitches selected, and on the encoding of the movement vectors and of the coefficients, etc.

For example, the data is time organized into respective levels by image, by group of blocks, by macroblocks, and by block.

Insofar as the data rate of the digital data output by the circuit 22 varies naturally, and insofar as the digital line has only limited data rate possibilities, it is necessary to provide a transmission buffer memory capable of storing the data to be transmitted, when the temporary data rate of the circuits 22 is greater than the data rate which the digital line L is capable of taking, the temporary reductions in the data rate of the circuits 22 being used to empty the transmission buffer memory (referenced 8 as indicated above) as much as possible over the digital line L.

The data rate is regulated by the regulator 10 acting on the entropy encoder of the circuits 22, on the first quantifier 20 and/or on the second selector 37, as a function of the level of filling of the transmission buffer memory 8, the filling level being supplied to the regulator 10 by the addressing auxiliary 38 for read and write addressing the memory, the auxiliary being time governed by a transmission clock (not shown) via a link referenced HT.

Figure 3:
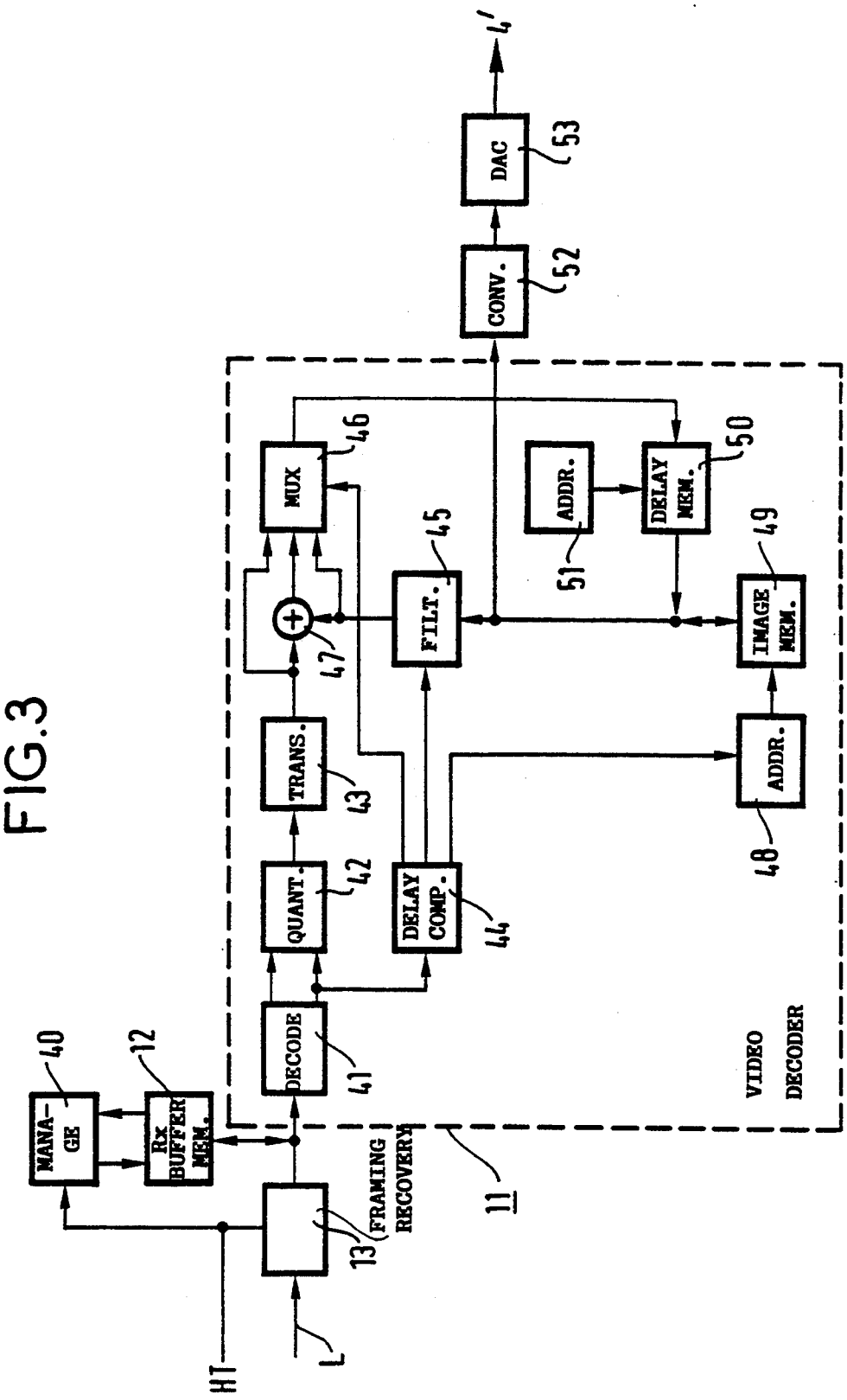

The example of a video decoding unit 6 shown in FIG. 3 is designed to be connected to an encoding unit 5 such as defined above via a line L, and to the above-mentioned transmission clock via the link HT.

As indicated above, the decoding unit 6 includes a framing recovery circuit 13 capable of using the added digitized data which is inserted for its attention by the correction code insertion circuit of the remote codec 1' connected thereto via the digital line L, and which is transmitted over the line in addition to the image digital data coming from the video multiplexing and entropy encoding circuit of the codec 1'.

The decoding unit 6 also includes a reception buffer memory 12 both for temporarily storing the digital data which includes the encoded image information and which comes from the digital line L via the framing recovery circuit 13, and also for restoring the information at a rate that is acceptable for the video decoder 11.

The reception buffer memory 12 is also time governed by the transmission clock via a link HT which leads to a management auxiliary 40 performing memory addressing and data rate regulation as a function of the processing possibilities of the video decoder 11.

The video decoder demultiplexes the video information and decodes the variable-length codes by means of an entropy decoding and video demultiplexing circuit 41 that is the inverse of the above-mentioned video multiplexing and entropy encoding circuit 22 of the encoding unit.

The digital data that appears at the output of the video demultiplexing circuit 41 must be processed in the video decoder 11 to enable the digital information required to view the images to be reconstituted.

The data from the video demultiplexing circuit is therefore transmitted, for the purposes of reconstituting the images and depending on the nature thereof, either to a processing assembly associating a quantifier 42 with an inverse discrete cosine transform operator 43, or to a delay compensation circuit 44 of an image reconstruction circuit described in more detail below.

The quantifier 42 corresponds to the second quantifier 21 of a video encoding unit 5, such as defined above, and the inverse discrete cosine transform operator 43 corresponds to the second operator 23 of the same video encoding unit 5.

The digital information obtained at the output of the operator 43 on the basis of the digital information supplied by the reception buffer memory 12, to the quantifier 42 for a block of image, corresponds to the digital information that appeared at the output of operator 23 for the same block of image.

The reconstruction circuit takes into account the transmitted information that relates to the encoding modes used for the blocks relating to the successive images, i.e. that information which makes it possible to determine whether the successively received macroblocks are encoded in inter mode or in intra mode, whether they are filtered or not, and whether they are compensated or not.

To this end, the digital information obtained at the output of the compensation circuit 44 makes it possible, where applicable, to act firstly on a loop filter 45 corresponding to the loop filter of the video encoder 7, secondly on the control input of a multiplexer 46 connected via its inputs to the output of the third operator 43 and to the output of the loop filter 45, either directly or via a common adder 47, and thirdly on an addressing auxiliary 48 for addressing an image memory 49.

An intermediate delay memory 50 corresponding to the intermediate memory 28 of the video encoder 7 is interposed between the output of the multiplexer 46 and the data input of the image memory 49. The intermediate delay memory acts in the same way as the intermediate memory 28, and it conventionally includes an addressing auxiliary 51 having the same function as the auxiliary 30 of the memory 28.

The image memory 49 records the digital image information that is supplied to it by the multiplexer 46 via the intermediate delay memory 50. The image memory temporarily retains the digital information relating to the preceding received image so long as the digital information relating to an image being recorded has not been fully recorded, and it is used to perform scanning conversion to enable data that is to be displayed by line-by-line scanning to be restored from data organized in blocks, and it is also used during reproduction at image frequency for viewing purposes, given that the previously-performed encoding influences the frequency at which the images appear depending on their contents and on any sub-sampling that may have been performed.

A standards converter 52 is connected to the output of image memory 49 to convert the digital information concerning a reconstructed image in intermediate format into a usual viewing format of 525 lines or 625 lines. The standards converter is usually associated with a digital to analog converter 53 making it possible to obtain video image signals of the analog type that can be used by a television screen receiver.

Figure 4:
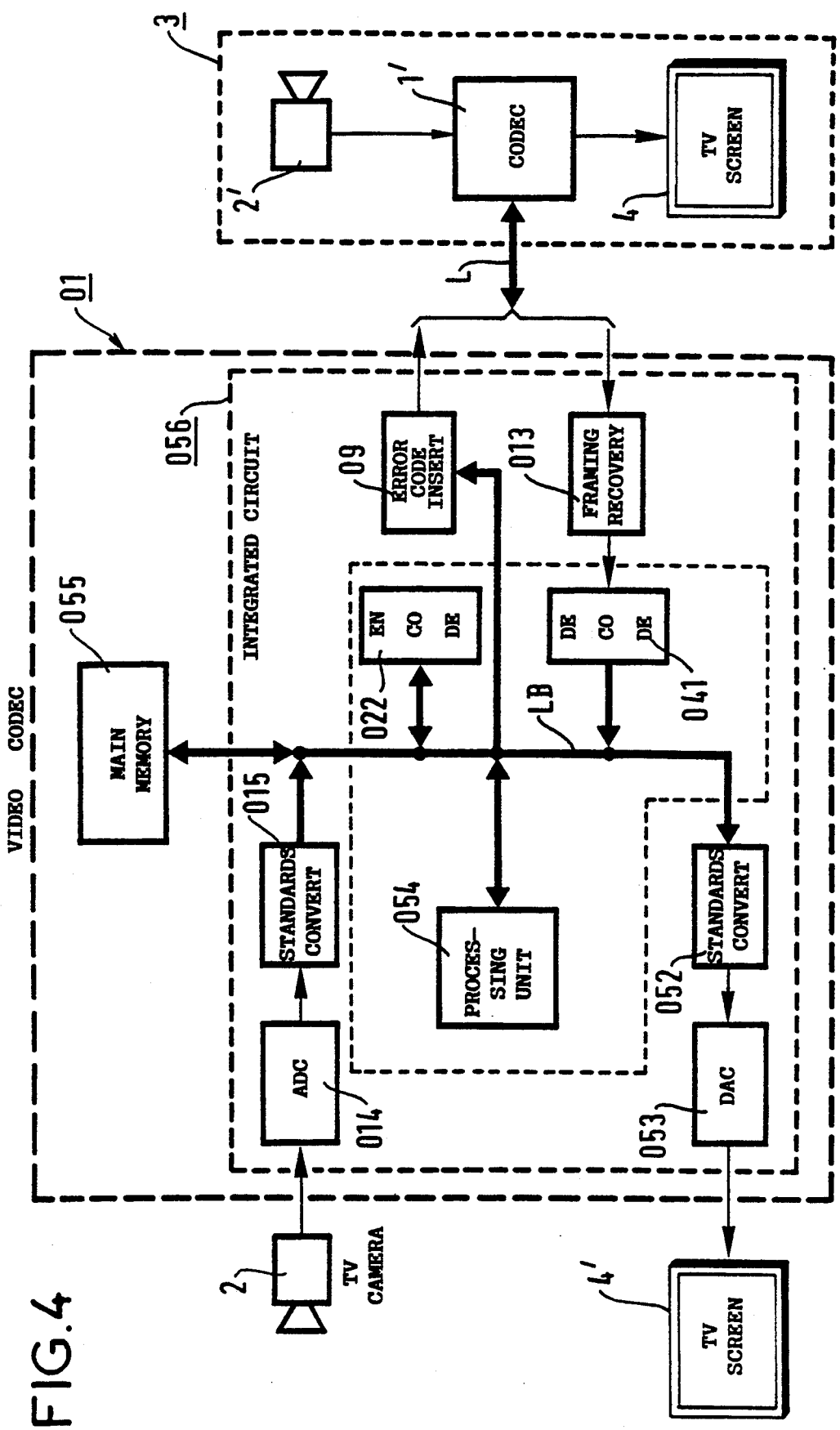
FIG. 4 is a block diagram showing a video codec of the invention.

As indicated above, FIG. 4 is a block diagram showing a video codec 1A of the invention.

The video codec 01 is designed to replace video codec 1, as shown in FIG. 1, and therefore to make it possible both to encode video image signals supplied by a television camera 2 so that they can be transmitted via a digital line L of a telephone network (not shown) to another codec 1' of remote equipment 3 provided with a television screen receiver 4 enabling the filmed images to be shown, and also to decode video image signals that are transmitted to it via the digital line L into video image signals that can be used by a television screen receiver such as 4'.

Like the above-described codec 1, the video codec 01 is dependent on an external processor and on an external clock (neither of which is shown), but it is different therefrom in that it includes a processing unit 054 and a main memory 055, both of which can be used for encoding and for decoding.

In the example shown, the processing unit 054 is part of a circuit referenced 056 and preferably an integrated circuit of the very large scale integration (VLSI) type, which includes the other constituent parts of the codec 01, with the exception of the main memory 055.

The main memory, which is of high capacity, may, for example, be composed of at least one package of memory of the VIDEORAM type, or of a DRAM-type package.

The processing unit 054 is connected to the external main memory 055 via a multifilament line LB, of the bus type, connected in particular to a video multiplexing and entropy encoding circuit 022 and to an entropy decoding and video demultiplexing circuit 041 performing the same functions as the encoding circuit 22 and the decoding circuit 41 of the video codec 1 defined above.

An error correction code insertion circuit 09 and an error correction and framing recovery circuit 013 are provided in the integrated circuit 056, and they perform the same functions as the circuits 9 and 13 of codec 1. Therefore, they are respectively inserted as follows: circuit 09 is inserted between the digital line L to which the codec 01 is connected and the bus LB, and the error correction and framing recovery circuit 013 is inserted between the digital line L and the entropy decoding and video demultiplexing circuit 041.

Two standards converters 015 and 052 operating in opposite directions from each other may be connected to the processing unit 054 by means of the bus link LB via the external main memory 055.

Standards converter 015 enables the video image signals to be put into the selected intermediate format, after they have been digitized by an analog-to-digital converter 014 and before they are processed and transmitted, and standards converter 052 enables the intermediate format signals received by the codec 01 to be restored in a video image format that can be used by a television screen receiver.

The format converters 015 and 052 are also provided in the integrated circuit 056 which, in a variant embodiment, also incorporates the analog-to-digital converter 014 and a digital-to-analog converter 053 placed at the output of the format converter 052 to restore, in analog form, the video images signals supplied thereby.

Figure 5:
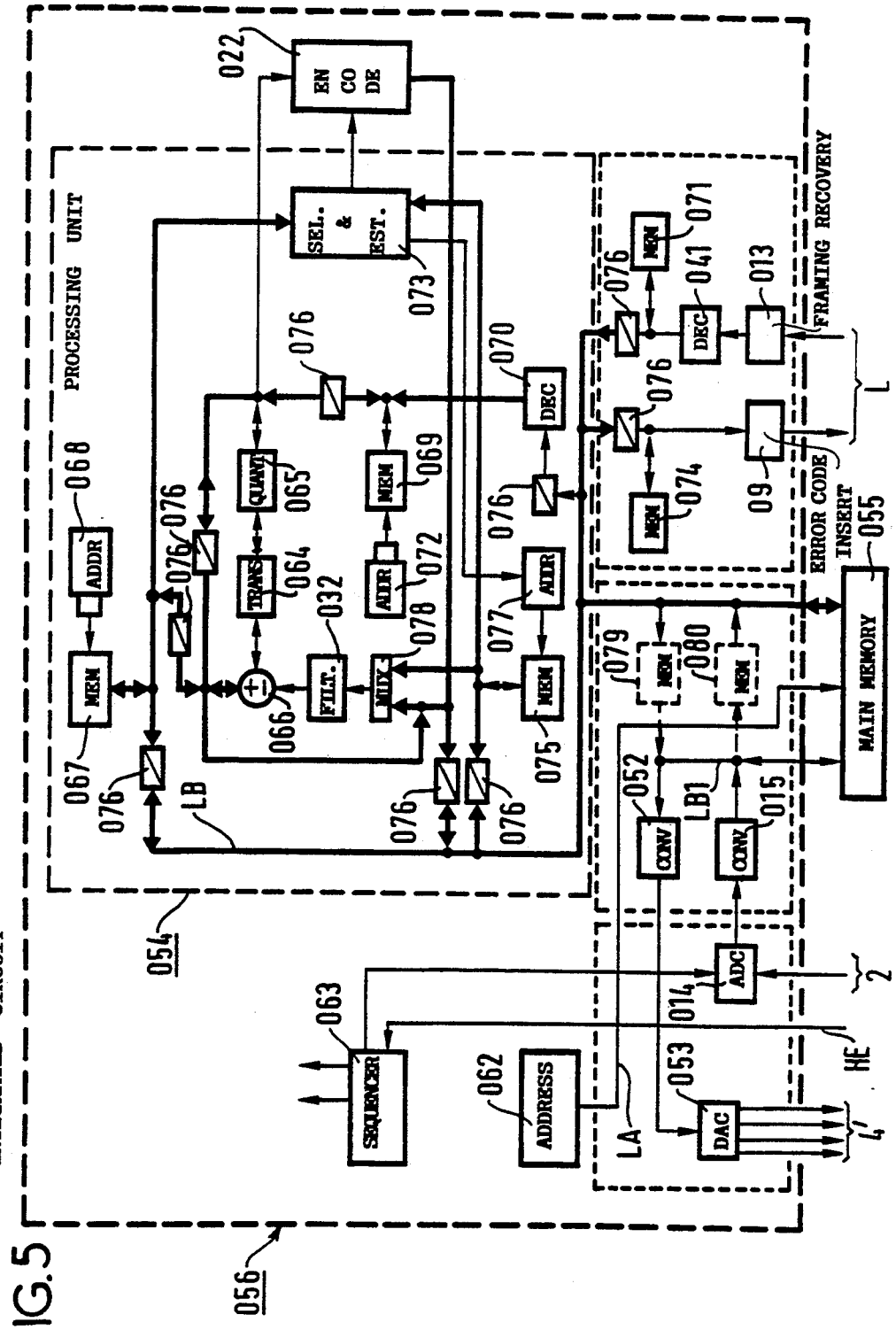
FIG. 5 is a block diagram showing a video codec of the invention and more particularly the processing unit of this codec.

The processing unit 054 is shown in more detail in FIG. 5 which shows the codec of the invention, i.e. the external main memory 055 and the integrated component 056 in which the processing unit is incorporated.

The processing unit 054 and the external main memory 055 are designed to perform the functions that are usually assigned to a video encoder such as 7 and to a video decoder such as 11, in a conventional codec, such as 1, with the exception of the functions performed by the video multiplexing and entropy encoding circuits 22 and by the video demultiplexing and entropy decoding circuit 41 of the prior art codec 1, which functions are performed in the integrated component 056 by circuits 022 and 041 that are respectively analogous therewith.

The external main memory 055 is designed to replace the various memories spread throughout both a conventional video encoder 1, such as above-defined memories 8, 16, 24, and 28, and also the memories spread throughout a conventional decoder 11, such as memories 12, 49, and 50. The external main memory is assisted locally by small auxiliary buffer memories that are described individually below and that are preferably used to limit the interchange between the external main memory 055 and the processing unit 054, during certain operating stages that are mentioned below.

The external main memory is organized in memory planes, and is therefore used via the bus link LB, e.g. of the multifilament type, which provides two-way data transfer between the external main memory and various relevant constituent parts whether for encoding or decoding in the processing unit.

An addressing auxiliary 062, situated in the integrated circuit 056 and connected to the external main memory 055 via an addressing link LA enables the external main memory to be used by various constituent parts (mentioned below) of the processing unit 054, both during the stages of encoding and during the stages of decoding. The addressing link LA is time-shared, and it is chosen to be of the single bus type, when the external main memory is modular.

A circuit 063 associating a sequencer with a time-base placed under the control of an external clock HE controls the running of operations performed at the codec 01 and in particular of the addressing of the external main memory 055, by acting on the addressing auxiliary in a manner that is conventional and that is therefore not described in detail below.

The processing unit 054 includes a discrete cosine transform operator 064 and a quantifier 065 connected together in series and time-shared. They are both operated either directly or inversely, thereby replacing the three cosine transform operators 18, 23, and 43, and the three quantifiers 20, 21, and 42 of a conventional codec, such as 1.

The assembly formed by the transform operator 064 and the quantifier 065 is connected via said transform operator to a first port of a "video" operator 066 that is alternately an adder or a subtracter, a second port of the video operator being connected to a "first" branch of the bus link LB, and a third port of the video operator being connected to the output of a loop filter 032 corresponding to the loop filter 32 of codec 1.

The first port of the video operator 066 makes it possible to transmit digital data to the bus LB via the second port, which digital data corresponds to the result supplied by the transform operator 064 when it operates inversely downstream from the quantifier 065 which also acts inversely on the basis of digital data received either from a first "reference" auxiliary buffer memory 067 when the above-mentioned assembly is used inversely, during operations intended for the purposes of transmission over digital line L, or from a "scanning conversion" auxiliary read/write memory 069 when the above-mentioned assembly is used inversely, for operations of reception by the video codec 01.

In the example shown, the first reference memory 067 is a read/write memory alternately used for temporarily storing the luminance data and the chrominance data of a macroblock of image, whether incident or predicted, which is to be encoded for transmission purposes, and said reference memory is governed by means of an addressing auxiliary 068.

The data relating to a macroblock of incident image, i.e. about 3 Kbits in one embodiment, is supplied by the external main memory 055 which in turn received it from the camera 2 via an analog-to-digital converter 014 and a converter 015, which converters operate identically to the converters 14 and 15 of codec 1.

In one embodiment of the invention, the analog-to-digital converter 014 is also incorporated into the integrated circuit 056 in the same way as the format converter 015.

The data relating to a macroblock of quantified predicted image is also supplied to the first reference memory 067 by the quantifier 065 via the bus link LB, the quantifier being in turn connected to the first branch of the bus link via a port serving as an output for it when it performs direct quantification.

The data processed by the quantifier then comes from a second reference memory 075 via the bus link LB, a multiplexer 078, the loop filter 032, the video operator 066, and the transform operator 064, the second reference memory having received said data from the external main memory 055.

The data supplied by the scanning conversion memory 069 to the quantifier 065 downstream from the transform operator 064 in the assembly formed thereby, when they are used inversely is transmitted via the above-mentioned port of the quantifier 065, said data coming from the external main memory via a second branch of the bus link LB and a decoding buffer block 070.

To this end, the second branch receives the data corresponding to at least one and, in the example in question, two encoded blocks supplied by the external main memory 055 which received them previously from the digital line L, via an error correction and framing recovery circuit 013, an entropy decoding and video demultiplexing circuit 041, and a reception data-rate matching memory 071. Said matching memory is of the first-in-first-out (FIFO) type and is small in size, e.g. having a capacity of $5 \times 16$ bits, and it makes it possible on reception to reconcile the processing data rate inside the integrated circuit 056 with the transmission data rate via the line.

The scanning conversion memory 069 is used in this case to reconstitute the transformation coefficients of a block on the basis of the data received via the digital line L, which data give amplitude and positioning with reference to the zigzag scanning. The scanning conversion memory preferably only has limited capacity, e.g. about 1 Kbit, and is governed by an addressing auxiliary 072.

The scanning conversion memory 069 is also used during the transmission stage to perform the inverse scanning conversion which makes it possible to obtain the data relating to the significant transformation coefficients of a block that are identified by zigzag scanning on the basis of the transformation coefficients as supplied by the quantifier 065 then operating directly. The scanning conversion memory is therefore connected in common to the quantifier 065 in the above-mentioned manner, and to the input of the video multiplexing and entropy encoding circuit 022.

The video multiplexing and entropy encoding circuit also receives the information coming from an inter/intra selection and estimation circuit 073 which performs and combines the functions assigned to the movement estimation circuit 31 and to the inter/intra mode selector 37 of codec 1.

The digital data extracted from the information received by the video multiplexing and entropy encoding circuit 022, via the inputs thereof, is multiplexed, encoded, and then transmitted over the bus link LB via a third branch thereof so that it can be transmitted over the digital line L, via the external main memory 055 acting as a transmission memory, via a small transmission synchronization matching memory 074, of the FIFO type, which, having a capacity of $2 \times 16$ bits for example, is connected to a fifth branch of the bus link LB, and via the error correction code insertion circuit 09 inserted between the matching memory 074 and the digital line L.

The circuit 073 combining the functions of estimation and of inter/intra selection is connected to the first reference memory 067 via a first input and via a first branch of the bus link LB, and said circuit is also connected to the second reference memory 075 via a second input and via a sixth branch of the bus link LB. Like the above-mentioned branches, the sixth branch is conventionally connected via an isolation buffer 076 to the trunk proper of the bus link LB which connects the integrated circuit 054 to the external main memory 055.

For example, the second reference memory 075 is a read/write memory which has a capacity of about 8 Kbits, it is governed by an addressing auxiliary 077 controlled by the sequencer circuit 063, like the other addressing auxiliaries of the integrated circuit 056, and by the inter/intra selection and estimation circuit 073.

The second reference memory 075 is for temporarily storing either the luminance data relating to the search zone for a block whose movement is to be estimated at each estimation stage, or the luminance data and the chrominance data of the video that is predicted and therefore possibly displaced. The second reference memory communicates with the external main memory 055 via the bus link LB.

The sixth branch of the bus link LB which connects the second reference memory 075 to the inter/intra selection and estimation circuit 073 also serves a first input of the multiplexer 078 controlling access to the loop filter 032, which in the example shown is a $3 \times 3$ two-dimensional space filter.

A second input of the multiplexer 078 is connected both to the third branch and to the fourth branch of the bus link LB.

As indicated above, the external main memory 055 may be made by means of packages, of the VIDEO-RAM type, which include a slow data port P1 to which the bus link LB is connected, a fast data port P2 to which the standards converters 015 and 052 are connected, and an addressing input AD to which the external addressing auxiliary 062 incorporated in the integrated circuit 056 is connected.

The external main memory 055 may also be constituted by a package, of the DRAM type, which has a data port to which the bus link LB is connected, and an addressing port AD to which the external addressing auxiliary 062 has access.

The standards converters 015 and 052 are then respectively connected to the bus link LB via buffer memories, of the first-in-first-out type, 079 and 080, inside the integrated circuit 056 of which they are part.

Figure 6:
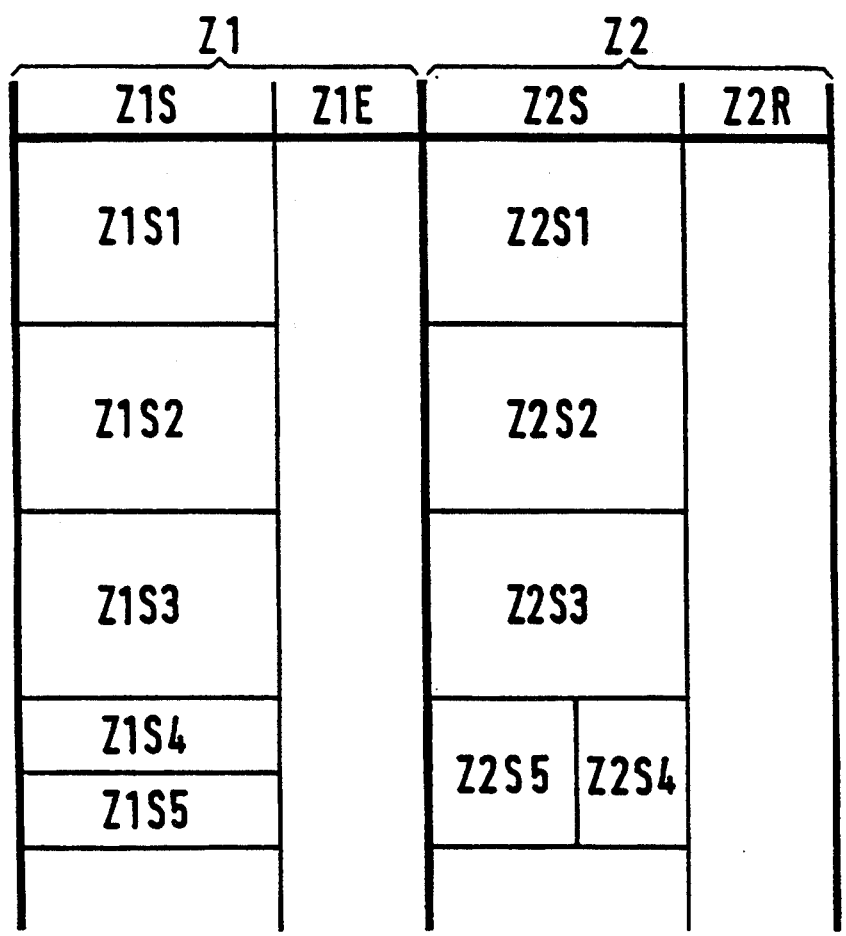
FIG. 6 shows an example of the internal physical organization of a main memory for a codec of the invention.

A preferred example of the internal organization of the main memory 055 is shown in FIG. 6. The memory composed of a series of "n" parallel planes, e.g. 8 or 16, configured identically and accessed simultaneously, is represented by a single one of the planes that is divided into two main zones Z1 and Z2 one of which is reserved for storing data for transmission purposes, and the other is reserved for storing data for local viewing purposes, and therefore in particular for that data which corresponds to image information received via the digital line L.

The main zone Z1, relating to transmission data, essentially includes a transmission buffer zone Z1E whose operation corresponds to that of the transmission buffer memory 8 of codec 1, and an image data temporary storage zone Z1S for temporarily storing image data to be processed for transmission purposes.

The image data storage zone Z1S is in turn subdivided into sectors. A first sector referenced Z1S1 receives the data of an image being acquired, which data originates from the camera 2. Two other sectors referenced Z1S2 and Z1S3 are interchangeable. One of them temporarily stores the data of the preceding image, which data is modified as prediction takes place, while the other sector temporarily stores the data of the same preceding image, which data is as obtained after prediction, and is used for predicting the image following the image of which it is part.

Each of the sectors Z1S2 and Z1S3 thus performs the two above-mentioned storage operations successively and cyclically.

Optionally, the storage zone Z1S may include a sector Z1S4 in which to store data of a prerecorded image, e.g. a fixed image, of the test card type, for replacing the images from the camera being transmitted, in certain cases of use. The storage zone may also include one or more sectors reserved for processing data concerning transmission, e.g. data used for the purposes of regulation in a sector such as Z1S5.

The main zone Z2 essentially includes a reception buffer zone Z2R whose operation corresponds to that of the reception buffer memory 12 of codec 1, and a separate storage zone Z2S for temporarily storing data relating to the image to be locally displayed on the television screen of the receiver 4'.

The temporary storage zone Z2S is subdivided into sectors. One of the sectors referenced Z2S1 receives the data of an image being acquired on reception. Two other sectors referenced Z2S2 and Z2S3 alternately and temporarily store the data of the acquired preceding image and the data of the same preceding image as processed.

Each of the three sectors Z1S1, Z2S2, and Z2S3 performs the three above-mentioned storage operations successively and cyclically.

Optionally, the storage zone Z2S may include a sector Z2S4 making it possible to store the data of an image to be inset into the next image to be viewed locally. The image to be inset may correspond to the image as simultaneously transmitted over the digital line L.

An additional sector Z2S5 may also be provided for inserting text into an image, for example on request.

Other sectors may also be provided in zone Z2S, or elsewhere in the main memory, for processing data, e.g. such as data defining character sets for the text to be inserted, or configuration data for the video codec 01, which data is then supplied via the processor (not shown) supervising the video codec 1 in the equipment in which the codec is incorporated.

In one embodiment, the processing, by the video codec 01, of an image supplied by the camera 2 starts by the converter 014 converting the analog signals coming from the camera into digital signals, and by the standards converter 015 putting the digital data into QCIF format, the standards converter performing horizontal and vertical filtering on the digital data output by the converter 014.

The luminance digital data and the chrominance digital data are transmitted via the bus link LB to the external main memory in which is it stored in sector Z1S1 reserved for storing incident image.

As soon as there is enough data stored in the sector to enable it to be processed in macroblocks, processing is commenced, involving macroblock-by-macroblock transmission from the sector Z1S1 in which the data is stored to the first reference memory 067 organized to contain one macroblock.

So that movement estimation can be undertaken for a macroblock MA1 temporarily stored in the first reference memory 067, the second reference memory 075 contains preceding image data relating to the zone in which a macroblock corresponding to the macroblock MA1 is contained.

In this example, the data comes from one of the sectors of the external main memory 055 that stores the image data which is obtained, after any displacement and prediction, on the basis of the image which precedes the image to which the macroblock MA1 belongs, e.g. sector Z1S3.

In this embodiment, it is the luminance data relating to the predefined macroblock search zone that is taken into account for estimation purposes, the search zone having its data temporarily stored in the second reference memory 075, as indicated above.

The movement estimation performed for a macroblock makes it possible to define the encoding mode (inter or intra) to be implemented for the blocks of the macroblock, the inter mode being chosen in this case when a movement vector is suitable for expressing a displacement that has occurred.

The displacement noted is taken into account in the second reference memory 075 for the purposes of transmission proper.

After the movement estimation and the prediction calculation, the macroblock MA1 is subjected to direct cosine transformation by the operator 064 and to direct quantification by the quantifier 065, the data taken into account in intra mode being that data which is stored in the first reference memory 067 in intra mode, the data coming from the second reference memory 075 via the loop filter 032, in inter mode, being subtracted therefrom in the video operator 066.

The data relating to the quantified predicted video, which data is supplied by the quantifier 065 operating directly, is written in the first reference memory 067 so as to be processed inversely so as to correspond to the data that is to be seen by the remote codec. The data relating to the quantified predicted video is also transmitted to the video multiplexing and entropy encoding circuit 022, after being converted by being read back by zigzag scanning in the scanning conversion memory 069 which receives it temporarily.

Circuit 022 also receives encoded information relating in particular to the transmitted encoded blocks and to the movement vectors used for the displaced macroblocks, coming from the inter Intra selection and movement estimation circuit 073.

The multiplexed and entropy encoded data supplied by circuit 022 is then transmitted via the bus link LB to the external main memory 055, so as to be temporarily stored in the transmission buffer zone Z1E before being sent over a transmission channel VE of the digital line L, via the data-rate matching memory 074 and the error code insertion circuit 09.

Simultaneously, the quantified prediction data stored in the first reference memory 067, after direct quantification, is restored and processed inversely by the series assembly formed by the quantifier 065 and by the cosine transform operator 064, and the data is combined in the video operator 066 with the data relating to the displaced reference video still contained in the second reference memory 075, for the purposes of locally reconstituting the transmitted macroblock.

The transmitted macroblock is then written in the first reference 067 so that it can be transmitted to the external main memory 055 via the bus link LB and temporarily stored therein in sector Z1S2, so as to constitute the predicted image which is to be used for processing the following image.

Processing by the video codec 01 of an image received via a reception channel of the digital line L starts by the error correction and framing recovery circuit 013 using the data coming from the remote codec 1', and then the entropy decoding and video demultiplexing circuit 041 processing the data.

After passing through the reception data-rate matching memory 071, the received data is transmitted to the external main memory 055 in which it is temporarily stored in the reception buffer zone Z2R, before being processed.

The data contained in zone Z2R is then transmitted to the decoding buffer block 070 in groups each corresponding to two blocks of encoded video, and then from there to the conversion memory 069 to be subjected to scanning conversion.

The conversion memory 069 makes it possible to reconstitute the data relating to the set of coefficients relating to a macroblock on the basis of the data received for that macroblock.

The data obtained by conversion is then quantified and inversely transformed by the assembly constituted by the quantifier 065 and by the discrete cosine transform operator 064.

The external main memory 055 simultaneously supplies an input of the multiplexer 078 with the corresponding data relating to the preceding received image, as reconstructed, which data was stored in one of the three interchangeable sectors in the zone Z2S, e.g. sector Z2S1, during local reconstruction of the preceding received image.

The data relating to a given macroblock of image, which data is extracted from the relevant sector of main memory, i.e. Z2S1 in this case, is then transmitted via the loop filter 032 so as to be combined by the video operator 066 with the data that may come from the transform operator 064 for the block corresponding to the following image.

The data simultaneously obtained at the output of video operator 066, and which relates to a macroblock of reconstructed image, is immediately written in one of the sectors, of the zone Z2S of external main memory 055, e.g. sector Z2S2, in which the macroblocks successively produced by the video operator 066 for the image then being reconstructed are stored.

In one selected embodiment, the third interchangeable sector in zone Z2S, i.e. in the selected example Z2S3, is chosen for storing the reconstructed image to be sent to the local television screen receiver 4, insofar as the image frequency acceptable for the receiver, i.e. usually 50 Hz or 60 Hz, does not correspond to the processing frequency, and insofar as this solution enables data processing on reception to be disassociated from the resulting display on the screen.

Generally speaking, the camera 2 and the line L may supply image data simultaneously at determined rates to the video codec 01 which must operate by time-sharing between transmission, reception and processing, and in a determined time organization. The time organization is a function of the image sampling clock signals which are defined by CCIR Recommendation 601, the clock frequency HE being, for example, chosen to be equal to 6.75 MHz on transmission and on reception.

The processing frequency, or dot frequency, must take into account the fact that it is preferable for an integer number of processing clock periods to correspond to one image, with the main image standards, and this means a minimum processing frequency of 2.5 MHz if the standards taken into account are those mentioned above.

The processing frequency and the sampling frequency must be synchronous to facilitate interchange within the video codec 01.

In a preferred variant embodiment, the processing frequency chosen is 4.5 MHz, so that one video line corresponds to 288 cycles at that processing frequency, when the number of images per second is 12.5. The processing time for a macroblock is then 2,880 cycles, i.e. 640 $\mu$s, and it corresponds to a frame of ten equal line times, referenced T0 to T9, each line time being in turn composed of four sub-times.

Some of the memory accesses to the external main memory 055 must be synchronous with the video line frequency, such as writing the image data supplied by the camera 2, and reading the image data to be displayed on the television screen of the receiver 4', while other accesses must be synchronous with the processing frequency of the blocks, such as reading and writing macroblock data used during image processing proper by the processing unit 054. The positioning of other accesses is relatively unimportant, such as the access for writing in the reception buffer sector, and that for reading in the transmission buffer sector.

In the example given, the first time T0 of a group G is assigned to the process of transmission by the codec 01, and more particularly to loading, in the second reference memory 075, of luminance data corresponding to the zone in which the macroblock to be processed is to be sought, the luminance data thereof previously having been loaded into the first reference memory 067 during time T9 of the preceding group, whereas the corresponding chrominance data is loaded into the first memory during the following time T5.

The four times T1 to T4 of the group G are simultaneously used for the process of transmission and for the process of reception by making use of the fact that the components of the codec that they use are not identical and can therefore act separately. Three pairs of blocks are successively received at a rate of one pair of blocks in five sub-times, one of the sixteen possible sub-times not being used. Movement estimation and inter-intra selection are simultaneously performed for the macroblock temporarily stored in the first reference memory 067 by means of the contents of the second reference memory 075, the memories not being used for reception purposes.

Time T5 is in part and successively reserved for data-rate regulation which is not explained in detail below, and for respectively and successively storing, in the second reference memory 075, the displaced prediction relating to the macroblock for which the movement estimation has just been performed and, in the first reference memory 067, the chrominance data of the macroblock which is to be processed during the following four times.

Time T6 is reserved for direct discrete cosine transformation and direct quantification processing of the macroblock, for transmission purposes, by the operator 064 and by the quantifier 065 of the codec 01.

Times T7 and T8 are essentially reserved firstly for macroblock inverse discrete cosine transformation and inverse quantification processing, for the purposes of local reconstruction in association with the process of transmission, by the same operator 064 and by the same quantifier 065, and secondly for writing, in the transmission buffer zone Z1E of the external main memory 055, data present at the output of the entropy encoding and multiplexing circuit 022.

End of group time T9 is then essentially reserved for writing the video macroblock which has just been reconstituted in the relevant sector of the external main memory, and then for writing, in the first reference memory 067, luminance data relating to the macroblock to be processed for the purposes of transmission during the following group of ten times.

What is claimed is:

1. A video codec particularly for videophone applications, and more particularly for a videophone terminal of an integrated services digital network, said codec being organized to receive firstly image signals coming from a local television camera so as to transmit them, after compressing and encoding them, to a compatible remote video decoding unit, in particular of another video codec, via a digital transmission line, in particular of the telephone type, and secondly image signals similarly compressed and encoded by a remote video encoding unit, in particular of said other video codec, the similarly compressed image signals being received via the digital transmission line, and then being decompressed and decoded for a television screen receiver locally connected to said video codec, wherein said video codec includes a processing unit co-operating with a single external memory plane both to compress and encode data to be transmitted, and also to decompress and decode received data, with the assistance of time-shared internal operational components;

wherein the processing unit includes a discrete cosine transform operator and a quantifier connected together in series and time shared in association with a loop filter firstly, directly and then inversely as regards the assembly comprising the transform operator and the quantifier, for processing macroblocks of image to be transmitted, and secondly, inversely as regards said assembly, for processing macroblocks of received image.

2. A video codec according to claim 1, wherein the processing unit including the quantifier and the discrete cosine transform operator connected together in series and time shared, also includes an inter-intra selection and movement estimation circuit and two read/write reference memories connected to the bus link, in the same way as the operator and the quantifier mentioned above, and simultaneously time shared for transmission, the first memory successively storing a macroblock of incident image to be processed for transmission, as obtained from the external main memory, and then the corresponding quantified prediction obtained when the quantifier works directly, and the second memory successively storing the preceding image zone, in which the macroblock to be processed is sought, as supplied by the external main memory, and then the result obtained after any displacement of the processed macroblock under the action of the movement estimation circuit connected via a first input to the first reference memory, via a second input to the second reference memory, and via an output to an addressing auxiliary of the second reference memory.

3. A video codec according to claim 1, wherein the processing unit including the quantifier and the discrete cosine transform operator connected together in series and time shared, also includes a read/write scanning conversion memory time shared for successively making it possible firstly to obtain data relating to significant transformation coefficients of a block identified by scanning, preferably in zigzag, on the basis of transformation coefficients received by said memory from the quantifier operating directly for transmission, and secondly to perform the inverse conversion on reception on the basis of the positioning data by reference to the selected scanning, and on the basis of the associated amplitude data, received via the digital line and via a buffer reception sector of the external main memory.

4. A video codec according to claim 1, including a single memory plane connecting an external main memory to an integrated circuit including the processing unit via a multifilament bus link which serves, in particular, the processing unit, said memory organized for temporary image storage, respectively for the purposes of transmission, reception, and processing before transmission or after reception, as well as for local inserting purposes, being write and read addressed by an addressing auxiliary included in the integrated circuit and specifically connected to the memory.

5. A video codec according to claim 4, wherein the external main memory is connected to an addressing auxiliary which is incorporated into the integrated circuit, and which performs firstly separate read and write addressing in two fixed zones, one of which forms a buffer for the processed image signals to be transmitted over the digital line, and the other of which forms a buffer for the signals received via the digital line and to be processed, and secondly separate addressing in analogous manner in three storage sectors for storing image to be transmitted, one of which sectors is assigned to storing the camera image data being acquired, and the other two sectors, which are interchangeable, are assigned to storing previously processed image data and image data as being obtained by processing, as well as separate addressing in analogous manner in three interchangeable transmitted image storage sectors, one sector being assigned to storing the data of an image being received, and the two other sectors being assigned to storing the data of the previously received image under reconstruction and preferably of the image previously reconstructed and in the course of being sent to the local television screen receiver.

6. A video codec according to claim 4, wherein the external main memory is connected via the bus link both to the processing unit included in the integrated circuit, and also to the output of a video multiplexing and entropy encoding circuit which is included in the integrated circuit, which receives the image data coming from the processing unit to be transmitted over the digital line, and which is controlled by an inter-intra selection and movement estimation circuit of said processing unit.

7. A video codec according to claim 4, wherein the external main memory is also connected via the bus link to the digital line via an error correction code insertion circuit, on transmission, and via an error correction and framing recovery circuit, via an entropy decoding and video demultiplexing circuit, on reception, said circuits being provided in the integrated circuit with the processing unit.

8. A video codec according to claim 4, wherein the external main memory, of the VIDEORAM type, which is connected via a first port to the bus link, is connected via a second port, of the series type, to two video standards converters respectively performing conversion to an intermediate format for processing the video signals received from the local camera, for the purposes of transmission over the digital line, and the inverse conversion for the signals processed by the codec for the television screen receiver locally connected thereto.

9. A video codec according to claim 4, wherein the external main memory, of the DRAM type, is connected via the bus link both to the processing unit of the integrated circuit and to the video standards converters respectively performing the conversion of video signals received from the local camera to an intermediate format so that they can be processed, and the inverse conversion for the signals supplied by the processing unit for the local television screen receiver.

* * * * *